N. S. McCRACKEN.
INSECT DESTROYER.
APPLICATION FILED JAN. 4, 1916.
1,197,514.
Patented Sept. 5, 1916.
2 SHEETS—SHEET 2.
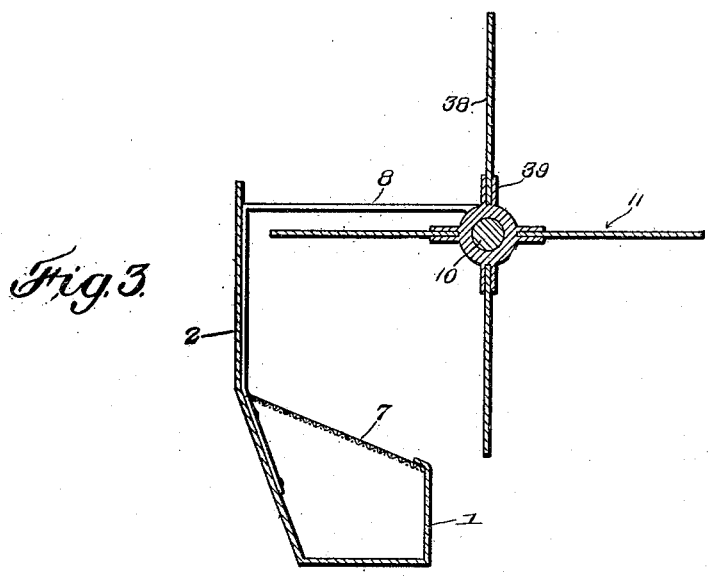
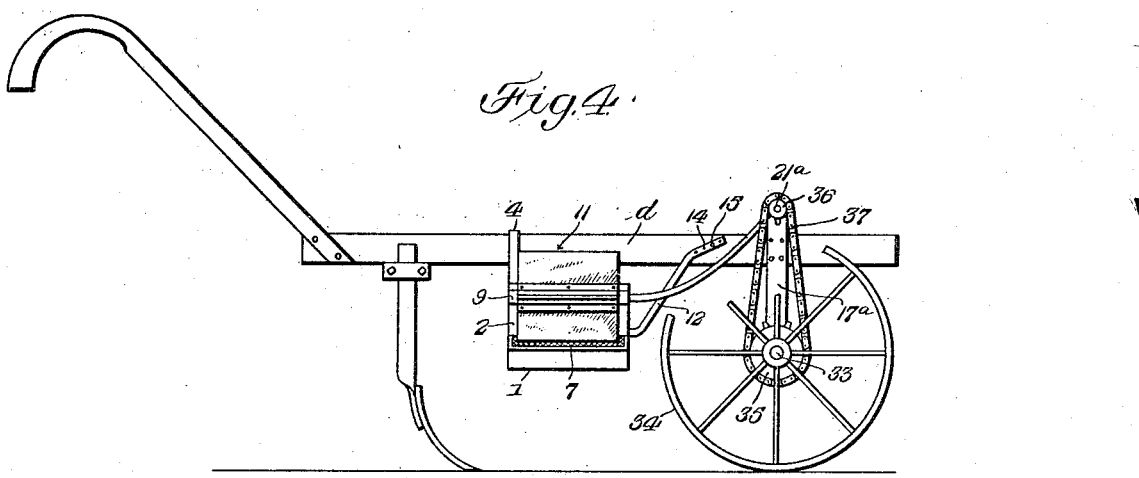

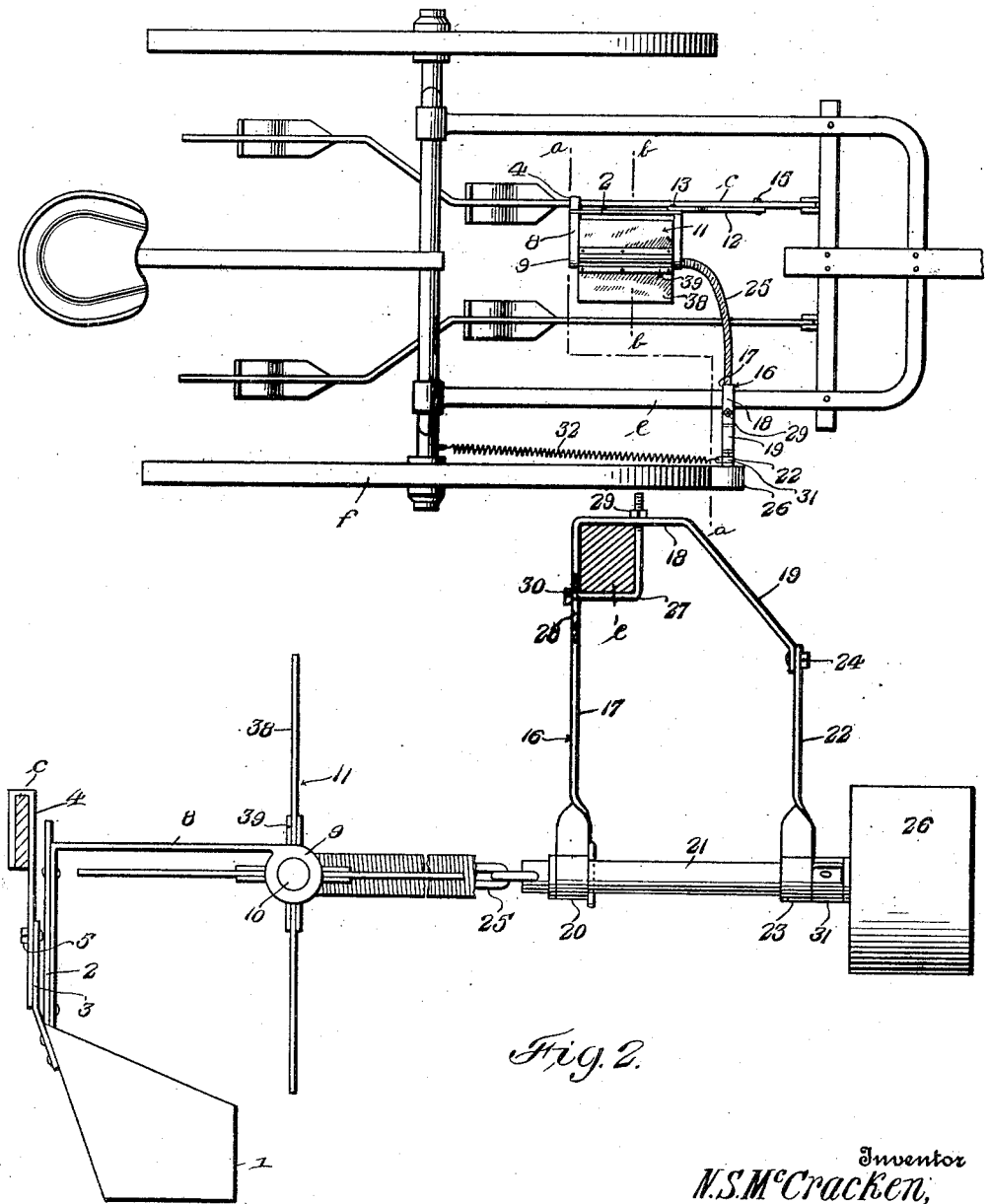

UNITED STATES PATENT OFFICE.

NINIAN S. McCRACKEN, OF NIXON, TEXAS.

INSECT-DESTROYER.

1,197,514.   Specification of Letters Patent.   Patented Sept. 5, 1916.

Application filed January 4, 1916. Serial No. 70,273.

*To all whom it may concern:*

Be it known that I, NINIAN S. MC-CRACKEN, citizen of the United States, residing at Nixon, in the county of Gonzales and State of Texas, have invented new and useful Improvements in Insect-Destroyers, of which the following is a specification.

This invention is an improved insect destroyer for use in connection with a cultivator for destroying cotton boll weevils and other noxious insects on the plants of cotton and other growing crops at the same time that the crop is plowed with the cultivator to enable the operations of cultivating the crops and destroying the insects to be performed simultaneously, the object of the invention being to provide an improved machine of this kind which is cheap and simple in construction, is strong and durable and which can be attached to, operated by and used in connection with any ordinary form of cultivator.

The invention consists in the construction, combination and arrangement of devices hereinafter described and claimed.

In the accompanying drawings: Figure 1 is a plan of an insect destroying machine constructed in accordance with my invention, and showing the same arranged on and for use in connection with a wheeled cultivator. Fig. 2 is a vertical sectional view of the same on the plane indicated by the line *a—a* of Fig. 1. Fig. 3 is a similar view on the plane indicated by the line *b—b* of Fig. 1. Fig. 4 is an elevation of a modified form of my insect destroying machine, showing the same attached to and arranged for operation by and in connection with a single beam cultivator.

In the embodiment of my invention I provide a pan 1 for the reception of a mixture of coal-oil and water or other liquid which will destroy insects placed therein. The pan is provided at the rear side with a vertical upwardly extending wall 2 and at the rear end of said wall, on the outer side thereof, is an arm 3 to which a clip hook 4 is adjustably connected by means of a bolt 5, the clip hook being adapted to be engaged over one of the beams *c* of a wheeled cultivator of usual form such as indicated in Fig. 1, or to be engaged over the beam *d* of an ordinary single beam sweep cultivator such as shown in Fig. 4, or on a beam of a double-shovel stock or other form of cultivator plow. Where the machine is used in connection with a wheeled cultivator as in Fig. 1 the pan is attached by the clip hook to the inner side of the left gang of cultivators as shown, so as to be operated close to the row of plants. A screen 7 of suitable mesh is arranged over the pan. A pair of outwardly extending horizontally arranged arms 8 are connected to and project from the rear wall 2 of the pans and are provided at their outer ends with bearings 9 in which the shaft 10 of a brush 11 is mounted for revolution. A supporting arm 12, for the front end of the pan, is pivotally connected to the rear side of the pan as at 13 and is provided near its front end with adjusting openings 14 any one of which may be engaged by a bolt 15 wherewith to adjustably secure said arm to the cultivator beam and thereby cause said arm to coact with the clip hook in detachably and yet firmly securing the pan to the cultivator beam.

I also provide a substantially U-shaped standard 16 having a vertical inner member 17, a horizontal upper member 18 and an outer member 19 the height of which is less than that of the member 17. Said member 17 has a bearing 20 at its lower end in which a shaft 21 is mounted for rotation. A movable standard member 22 also has a bearing 23 at its lower end for said shaft and is pivotally connected near its upper end to the lower portion of the standard member 19 by a bolt 24. The shaft is adapted to play loosely in the bearing 23 and said member 22 is shiftable so that the shaft is mounted for angular movement to a limted degree. The shaft 21 has its inner end connected to the front end of the shaft 10 by a flexible shaft member 25 which is here shown as made of coiled wire but which may be of any suitable construction. A friction wheel 26 is secured to the outer end of the shaft 21. The standard may be secured to one side bar *e* of the wheeled cultivator at the right hand side of the latter, by means of an L-shaped bolt 27, the standard being arranged with said bar of the cultivator frame in the angle between its members 17—18 and said bolt also extending angularly around said bar of the cultivator frame as shown in detail in Fig. 2. The standard member 17 has a slot 28 to admit of vertical adjustment of the bolt to adapt the standard member to be fitted on various cultivators and one arm of the bolt is provided with a clamping nut 29 to engage under the member 18 of the standard, the other arm of the bolt having a clamping nut 30 to engage the member 17 of the standard as shown.

A cuff 31 is loosely mounted on the shaft 21 near the outer end of the latter. A coiled spring 32 has one end attached to said cuff and the other end attached to said member 2 of the cultivator frame and draws rearwardly on the outer end of the said lever and causes its friction wheel 26 to bear against the periphery of one of the wheels $f$ of the cultivator.

When the cultivator is in operation the shaft 21 is rotated by the friction wheel 26 and wheel $f$, as will be understood, and the brush shaft, being connected to the shaft 21 by the flexible member is also rotated and the wings of the brush 11 beat the young plants as the brush passes them, knocks the insects from the plants without injuring the latter, and throw the insects into the liquid in the pan and hence cause the insects to be destroyed. It will be observed that since the pan is connected directly to one of the cultivator beams the pan and brush are moved with said beam and hence can be always maintained in the required operative relation to the plant by the operator by the same effort which he employs in adjusting the shovels of the clutivator.

In the form of the invention shown in Fig. 4 in which the insect destroying machine is especially adapted for use in connection with an ordinary cultivator the standard 17$^a$ is provided near its lower end with a stub shaft 33 on which are mounted a ground wheel 34 and a sprocket wheel 35 which rotates with the ground wheel. A sprocket wheel 36 is substituted for the friction wheel on the shaft 21$^a$ and is connected by an endless sprocket chain 37 with the sprocket wheel 35. In this form of the invention the spring 32 is dispensed with and the standard member 22 is clamped firmly to the member 19 by the bolt 24.

It will be understood that my improved insect destroying machine may be attached to, operated by and used in connection with any form of cultivator. The wings 38 of the brush are made of flexible material and are here shown as attached to the shaft 10 by angle metal pieces 39. They may be secured to said shaft by any suitable means within the scope of the invention.

Having thus described my invention, I claim:—

The herein described insect destroying machine comprising a pan having means to attach and suspend the pan from a beam of a cultivator, bearing members carried by the pan, a brush having its shaft mounted in said bearing members and arranged above the pan, a standard comprising a depending arm and an outwardly extending arm, means to secure said standard to one side of the cultivator frame so that said side of the cultivator frame is arranged in the angle between said arms of the standard, a member pivotally connected to and extending downwardly from the outwardly extending arm of the standard, said member and said depending arm of the standard, each having a bearing, a shaft mounted in said bearings, and provided at its outer end with a friction wheel for engagement with a wheel of the cultivator, a spring connected to said shaft and to a fixed point, to normally hold said shaft with its friction wheel in engaged position, and a flexible shaft connecting said shaft with the brush shaft.

In testimony whereof I affix my signature in presence of two witnesses.

NINIAN S. McCRACKEN.

Witnesses:
 Mrs. ELLEN WEBER,
 R. C. SIKES.

Copies of this patent may be obtained for five cents each, by addressing the "Commissioner of Patents. Washington, D. C."